US011191014B2

(12) United States Patent
Sayadi et al.

(10) Patent No.: US 11,191,014 B2
(45) Date of Patent: Nov. 30, 2021

(54) MOBILE DEVICE ROAMING BASED ON USER'S NETWORK PROFILE

(71) Applicant: ALCATEL LUCENT, Nozay (FR)

(72) Inventors: Bessern Sayadi, Nozay (FR); Sylvaine Kerboeuf, Nozay (FR)

(73) Assignee: ALCATEL LUCENT, Nozay (FR)

( * ) Notice: Subject to any disclaimer, the term of this patent is extended or adjusted under 35 U.S.C. 154(b) by 0 days.

(21) Appl. No.: 16/465,236

(22) PCT Filed: Nov. 29, 2017

(86) PCT No.: PCT/EP2017/080742
§ 371 (c)(1),
(2) Date: May 30, 2019

(87) PCT Pub. No.: WO2018/099935
PCT Pub. Date: Jun. 7, 2018

(65) Prior Publication Data
US 2019/0327671 A1    Oct. 24, 2019

(30) Foreign Application Priority Data
Dec. 2, 2016  (EP) ..................... 16202019

(51) Int. Cl.
*H04W 48/18* (2009.01)
*H04W 76/10* (2018.01)
(Continued)

(52) U.S. Cl.
CPC ......... *H04W 48/18* (2013.01); *H04L 41/5003* (2013.01); *H04W 8/18* (2013.01);
(Continued)

(58) Field of Classification Search
CPC ..... H04W 36/30; H04W 36/26; H04W 48/18; H04W 8/18; H04W 36/245;
(Continued)

(56) References Cited

U.S. PATENT DOCUMENTS 7,139,570 B2 * 11/2006 Elkarat ................... H04W 8/06
                                                 455/432.3
7,333,808 B2 *  2/2008 Elkarat ................... H04W 8/06
                                                 455/422.1
(Continued)

FOREIGN PATENT DOCUMENTS

CN    105830394 A    8/2016

OTHER PUBLICATIONS

International Search Report and Written Opinion for Application No. PCT/EP2017/080742 dated Jan. 17, 2018, 16 pages.
(Continued)

*Primary Examiner* — Man U Phan
(74) *Attorney, Agent, or Firm* — Alston & Bird LLP

(57) ABSTRACT

There is described therein a method of roaming between 5G networks operator for selecting a network operator in a visited country when a mobile network user exits an area covered by a home network operator to enter the visited country covered by a plurality of visited network operators. This method of roaming is based on the concordance between the VNF supported by the visited country network and the network profile of the user. The network profile of the user embeds both the functions commonly chained in his home network to deploy the services corresponding to his usage and the functions required in the visited country network to perform the services desired by the user. Therefore, by matching this profile with VNF capabilities deployed by a network the invention allows a better user satisfaction in roaming situations providing them with the most suitable network.

18 Claims, 2 Drawing Sheets

(51) Int. Cl.
*H04L 12/24* (2006.01)
*H04W 8/18* (2009.01)
*H04W 36/00* (2009.01)
*H04W 36/30* (2009.01)

(52) U.S. Cl.
CPC ....... *H04W 36/0085* (2018.08); *H04W 36/30* (2013.01); *H04W 76/10* (2018.02)

(58) Field of Classification Search
CPC .............. H04W 36/0083; H04W 76/10; H04L 41/5003; H04L 12/24
USPC ........................................................ 370/328
See application file for complete search history.

(56) References Cited

U.S. PATENT DOCUMENTS

| | | | |
|---|---|---|---|
| 7,447,499 B2 | 11/2008 | Bridges et al. | |
| 8,073,441 B1* | 12/2011 | Unger | H04W 48/18 455/422.1 |
| 8,229,431 B2* | 7/2012 | Buckley | H04W 48/18 455/435.3 |
| 8,391,857 B2* | 3/2013 | Catalano | H04W 48/18 455/432.1 |
| 8,825,876 B2* | 9/2014 | Krishnaswamy | H04L 41/0896 709/228 |
| 8,879,529 B2* | 11/2014 | Nieves | H04W 8/065 370/338 |
| 8,903,380 B2* | 12/2014 | Unger | H04W 48/18 455/432.1 |
| 9,088,931 B2* | 7/2015 | Haran | H04W 48/12 |
| 9,288,148 B1 | 3/2016 | Krishnaswamy et al. | |
| 9,414,305 B2* | 8/2016 | Pankajakshan | H04W 48/18 |
| 9,497,698 B2* | 11/2016 | Unger | H04W 48/18 |
| 9,713,080 B1* | 7/2017 | Lee | H04W 48/18 |
| 10,045,201 B2* | 8/2018 | Haran | H04L 5/0055 |
| 10,178,497 B2* | 1/2019 | Unger | H04W 76/18 |
| 10,470,032 B1* | 11/2019 | Ziegler | H04M 15/66 |
| 10,595,247 B2* | 3/2020 | Horn | H04W 24/02 |
| 10,779,230 B1* | 9/2020 | Sethi | H04W 36/16 |
| 2002/0068574 A1* | 6/2002 | Vestergaard | H04W 48/18 455/445 |
| 2005/0190716 A1 | 9/2005 | Buckley et al. | |
| 2006/0172735 A1 | 8/2006 | Buckley et al. | |
| 2007/0049269 A1* | 3/2007 | Ophir | H04W 8/06 455/432.1 |
| 2007/0265021 A1* | 11/2007 | Igaue | H04W 8/04 455/461 |
| 2009/0149178 A1 | 6/2009 | Bangma | |
| 2009/0215447 A1 | 8/2009 | Catalano et al. | |
| 2012/0157041 A1* | 6/2012 | Cai | H04L 12/1453 455/406 |
| 2015/0223042 A1* | 8/2015 | Li | H04M 15/852 455/406 |
| 2015/0288541 A1* | 10/2015 | Fargano | G06F 9/45558 709/225 |
| 2015/0288767 A1* | 10/2015 | Fargano | H04L 41/0896 709/227 |
| 2016/0353268 A1 | 12/2016 | Senarath et al. | |
| 2017/0180969 A1* | 6/2017 | Chai | H04L 12/14 |
| 2017/0250870 A1 | 8/2017 | Zhao | |
| 2017/0311244 A1* | 10/2017 | Kodaypak | H04W 8/14 |
| 2019/0037398 A1* | 1/2019 | Eriksson | H04W 36/00 |
| 2019/0104442 A1* | 4/2019 | Witzel | G06F 9/45558 |
| 2020/0015158 A1* | 1/2020 | So | H04W 48/16 |

OTHER PUBLICATIONS

Extended European Search Report for Application No. EP 16202019.2 dated May 29, 201, 15 pages 7.
Office Action for Chinese Application No. 201780074666.3 dated Dec. 3, 2020, 7 pages.
Office Action for Chinese Application No. 201780074666.3 dated Jun. 30, 2021, 10 pages.

* cited by examiner

MOBILE DEVICE ROAMING BASED ON USER'S NETWORK PROFILE

CROSS-REFERENCE TO RELATED APPLICATIONS

The present application is a national phase entry of International Application No. PCT/EP2017/080742, filed Nov. 29, 2017, which claims priority to European Application No. 16202019.2, filed Dec. 2, 2016, all of which are incorporated herein by reference in their entirety.

BACKGROUND

Technical Field

The present invention relates to a method of roaming between networks, which comprises selecting a network based on a user's network profile.

It finds applications, in particular, in mobile networks environments and is aimed at improving the experience of users of any mobile device (such as smart-phones) when travelling abroad.

Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The fifth generation of mobile networks (5G networks) is expected to be the next major phase of mobile telecommunication standards and to bring many improvements in mobile network user experience. For instance, 5G networks should provide new technical solutions allowing a greater throughput, lower latency, higher reliability, higher connectivity and higher mobility range.

In addition to these improvements in terms of performance, 5G networks are also expected to extend the flexibility in the network usage and to allow providing users with a wider range of use cases and business models. This means that modular functions included in the 5G networks architecture should be deployed on demand and allow to accommodate for various use cases in an agile and cost efficient manner.

Such functional modularity will be rendered possible by the use of two key technologies that are Software-Defined Networking (SDN) and Network Function Virtualization (NFV).

SDN adds a level of abstraction to network management by separating decisional aspects and operational aspects of the equipment. Decisions are taken through a unique controller that can be deployed on servers, hence allowing more flexibility in terms of capacities.

NFV is a network architecture that virtualizes network functions making them run on virtual machines on top of the hardware network infrastructure. These Virtual Network Functions (VNF) allow building-up blocks that can be connected or combined so as to offer full-scale networking communication services. Using these VNF opens the way to the use of flexible functions that can be tailored for each use case. Indeed, VNF can be scalable such that capacity is provided where and when needed.

An exemplary use case is a situation where an operator announces some service capabilities and associated context attributes, like price, location . . . VNF will allow the user to choose its preferences according to his knowledge of these capabilities, and the corresponding services will be provided and charged to the user accordingly.

The aim of the present invention is to extend the above mentioned use case to the implementation of roaming functionality.

Prior Art

In current systems, a roaming user mobile device has to select a new network operator in the visited country among a plurality of local network operators. This local network selection is based on a static ordered list of preferred operators. Furthermore, this list is predetermined and based on previously established Service Level Agreement (SLA) between the home network operator of the user and the local network operators in the visited country (e.g. Roaming contract).

The user is not implicated in this selection and the list on which rely the selection is built without taking into account the user's expectations nor the visited country network capabilities. This way of roaming can generate user dissatisfaction since such automatically operated network selection may result in the user not being offered the services he would like to.

An alternative type of roaming has been proposed by AT&T in U.S. Pat. No. 7,447,499 which discloses selecting a network for a user based on the services he subscribed in his own country and on the services offered by mobile network operators in the visited country. In particular: there is disclosed an apparatus for providing preferred wireless carrier information for use by a mobile station which uses a database that stores preferred wireless carrier identities based upon predetermined class of service, then generates a list from it, and provides the generated list to the mobile station.

However, this solution does not take into account user consumption habits and expectations nor the actual capabilities offered by the possible roaming networks, nor their SLA with user home network and their costs.

SUMMARY

To address these needs, a first aspect of the present invention relates to a method of roaming between 5G networks operators for selecting a network operator in a visited country. This method of roaming is based on the concordance between the VNF supported by the visited country network and the network profile of the user.

The network profile of the user (later referred to as User's Network Profile UNP) embeds both the functions commonly chained in his home network to deploy the services corresponding to his usage and the functions required in the visited country network to perform the services desired by the user. Therefore, by matching this UNP with VNF capabilities deployed by a network the invention allows a better user satisfaction in roaming situations providing them with the most suitable network.

In one embodiment of the present invention, there is proposed a method of selecting a roaming network operator in a visited area when a user of a mobile terminal exits a home area covered by a home network operator to enter the visited area, said visited area being covered by a plurality of local networks managed by a plurality of local network operators, said method comprising:

measuring the strength of radio signals received in the visited area from local networks managed by local operators having a Service Level Agreement, SLA, with the home network operator;

retrieving first information related to past usage by the user of services within the home network, and/or inferring second information related to user's future needs for services in the visited area, said first and second information being combined into a generated User's Network Profile associated to the user;

obtaining Virtual Network Function, VNF, capabilities of each local network operator of the visited area having a SLA with the home network operator and exhibiting a radio signal strength suitable for establishing a radio connection with the mobile terminal in the visited area, and generating a list of candidate roaming networks having VNF operator profiles matching said VNF capabilities;

comparing the User's Network Profile with the VNF operator profiles of the listed candidate roaming networks and generating an ordered list of candidate networks based on matching results of said comparing; and, establishing a radio connection in the visited area with a local network selected from the top of the ordered list of candidate roaming networks.

Furthermore, according to embodiments taken alone or in combination:

the knowledge of the past usage of services by the mobile terminal user in the home network is maintained by monitoring services used by the user in said home network environment and by storing a corresponding service indicator into a user's mobile terminal database.

the user's future needs for services in the visited area are inferred automatically from a user's agenda and/or from a user's to-do tasks list.

user's future needs for services in the visited country are expressed directly by the user by interfacing with the mobile terminal.

the VNF to deploy by a network to offer a service are obtained by monitoring the previous use of services by the user in his home network and retrieving the VNF associated to used services.

the User's Network Profile is dynamically generated and updated in real time.

the VNF capabilities of a local networks comprise one or more of the following:
  the connectivity to 2G, 3G, 5G and/or LTE networks.
  an intrusion detection and protection function;
  a firewall;
  a Domaine Name System;
  a Policy and Charging Rule Function;
  an application optimizer function;
  a caching node function;
  a video push function; and,
  a privacy support function.

each VNF capability offered by a local operator is identified by an associated VNF identifier to which price conditions, and/or location, timing and/or day/night availability is associated.

the collecting and gathering of VNF capabilities of each network local operator of the visited area to establish a list of VNF operator profiles is achieved through the use of the associated VNF identifier.

a priority mechanism is implemented to establish a hierarchy between the user's past usage of the home network and the user's future needs, said mechanism being used to the User Network Profile with the VNF operator profiles of the listed candidate roaming networks.

A second aspect of the invention relates to a computer program product comprising one or more stored sequences of instructions that are accessible to a processor and which, when executed by the processor, cause the processor to perform the steps of a method according to the first aspect.

BRIEF DESCRIPTION OF THE DRAWINGS

Embodiments of the present invention are illustrated by way of example, and not by way of limitation, in the figures of the accompanying drawings, in which like reference numerals refer to similar elements and in which.

DESCRIPTION OF PREFERRED EMBODIMENTS

Future 5G networks are expected to exhibit new capabilities leveraging the Network Function Virtualization (NFV) and Software Defined Network (SDN) concepts. For instance, one of these capabilities on which rely embodiments of the present invention is the Virtual Network Function (VNF) Capability Exposure Layer (CEL).

Figure 1:
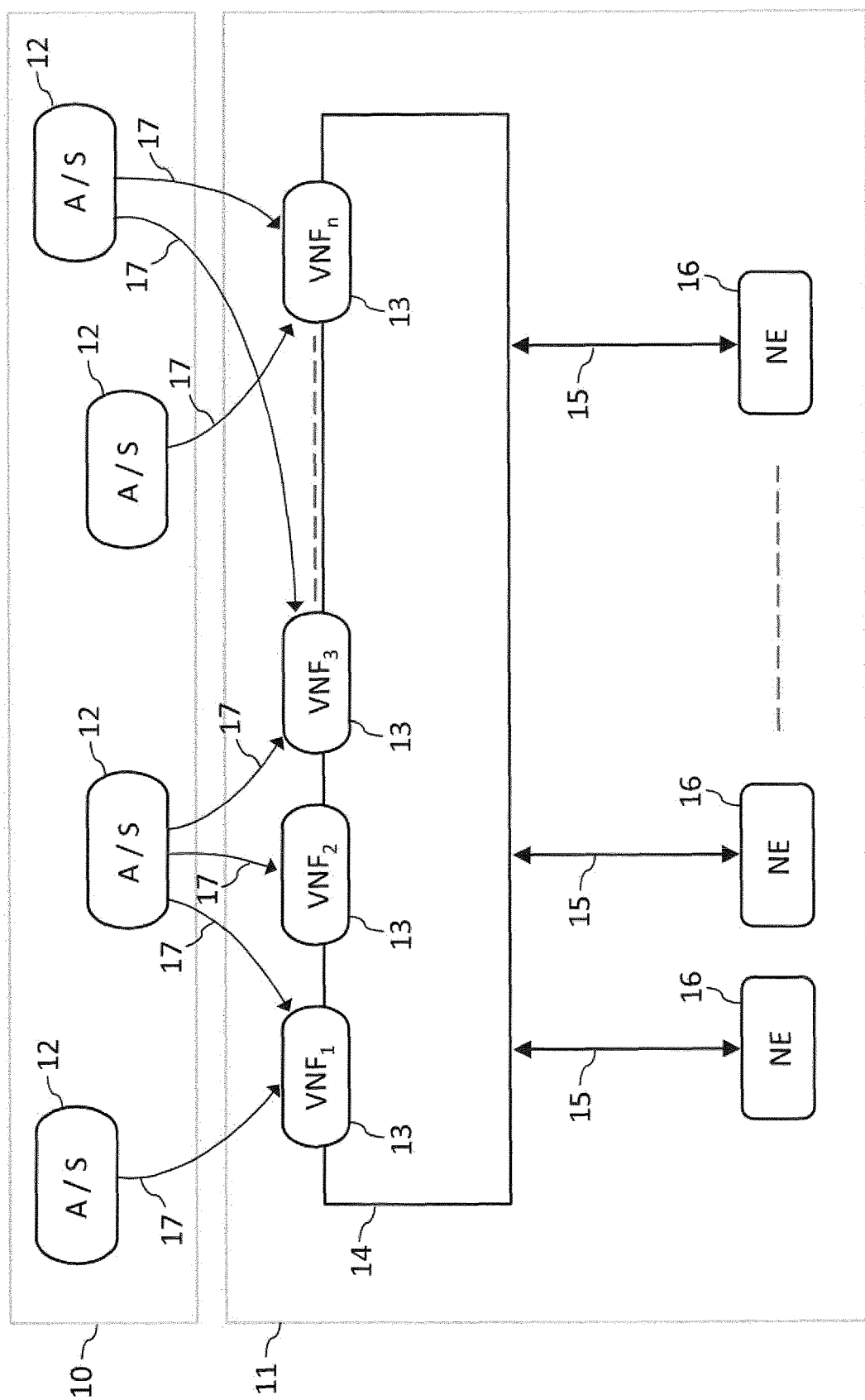
FIG. 1 is a schematic view showing the functioning of a VNF capability exposure layer.

Referring to FIG. 1, there is shown therein a schematic view of the principle of operation of the VNF-CEL. In the context of a SDN, the application domain 10 and the network domain 11 are distinct. The applications and services (A/S) 12 that a user of the network could exploit are included in the application domain 10, and the physical network elements (NE) 16 are included in the network domain 11.

The VNF-Capability Exposure Layer 14 acts like a database by listing all the Virtual Network Functions 13 that can be run by the network. In order to be able to establish this listing, the VNF-CEL 14 interacts with the real network entities 16 as it is illustrated by the arrows 15 in FIG. 1, and gathers all the VNF capabilities of the network. These VNF are, according to the European Telecommunications Standards Institute (ETSI), functional blocks within a network infrastructure that have well-defined external interfaces and well-defined functional behaviour. As such, they can be connected or combined to offer networking communication services. Besides the VNF themselves, the listing includes all their associated context attributes like, for instance, pricing, timing or day/night availability specifications.

This listing is hosted in the SDN controller so that the VNF-CEL can achieve its purpose which is to expose the VNF and their associated attributes to the application domain 10. This means that all applications and services 12 within the application domain 10 can retrieve the VNF capabilities of the network exposed by the VNF-CEL 14 so as to be able to operate as shown by the arrows 17.

VNF capabilities can comprise, for instance, one or more of the following:
  Connectivity to 2G, 3G, 5G and/or LTE networks;
  Intrusion detection and protection function;
  Firewall;
  Domaine Name System;
  Policy and Charging Rule Function;
  Application optimizer function;

Caching node function;
Video push function; and,
Privacy support function.

The above list is purely exemplary, and is neither exhaustive nor limiting.

Embodiments of the invention rely on the capacity to match these VNF capabilities with the profile of a user of a mobile network in roaming.

Figure 2:
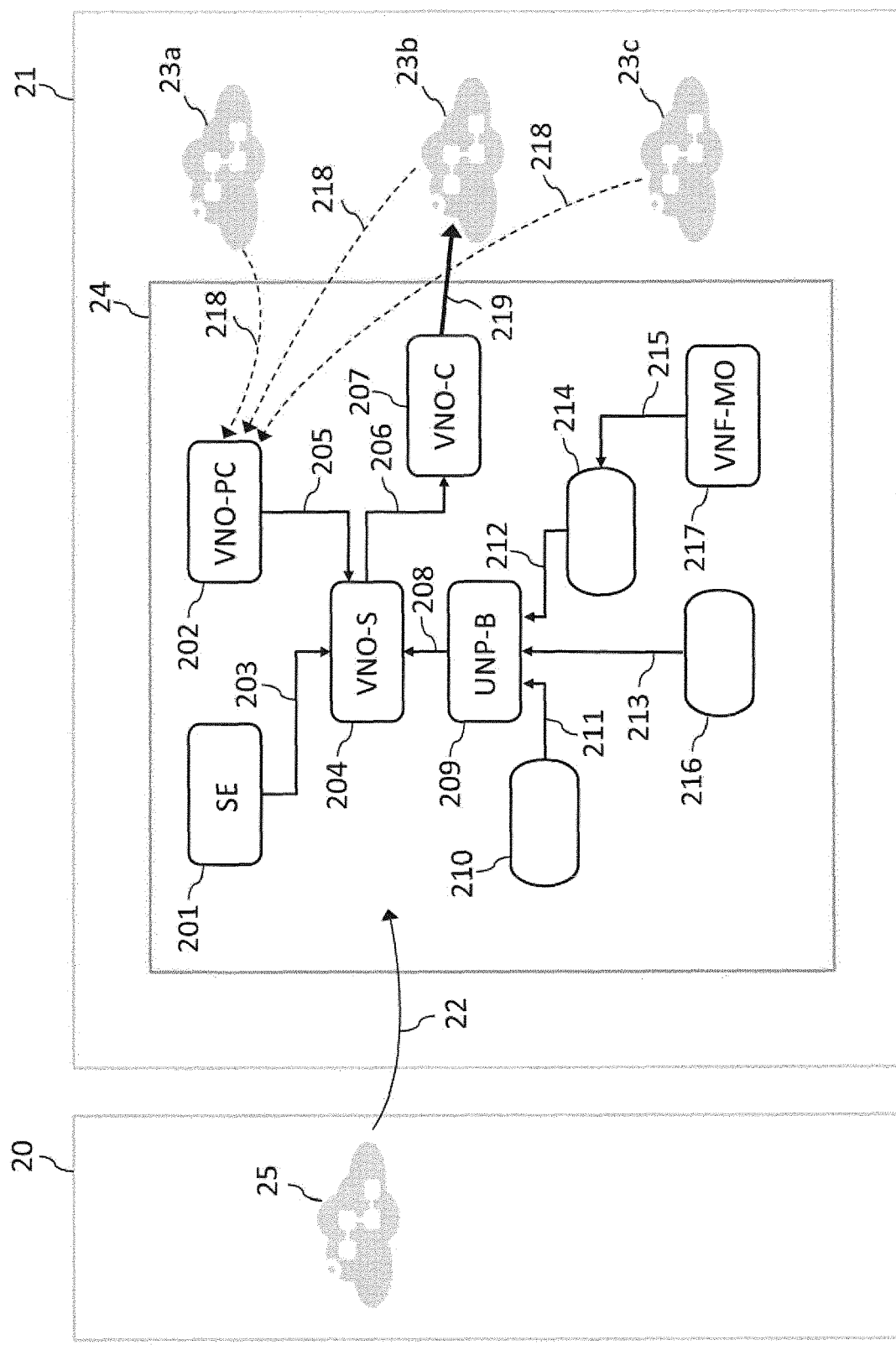
FIG. 2 is a schematic view showing an embodiment of the steps of the method of 5G roaming for selecting a network based on a user's network profile.

Referring to FIG. 2, there is shown therein a schematic view of an embodiment of the steps of the method of 5G roaming, which are carried out for selecting a local network based on a user's network profile. For the purpose of the present description, the method is decomposed into functional blocks. It will be appreciated by the one with ordinary skills is the art, however, that such decomposition is purely illustrative and that embodiments can implement varying functional decomposition.

FIG. 2 illustrates an example in which a mobile network user in roaming is leaving his home country 20, in which his mobile is operated by his home network operator 25, to enter a visited country 21 in which three different potential visited network operators 23a, 23b and 23c could be chosen to carry on the operation of his mobile device.

The roaming itself is illustrated in the figure by the arrow 22 and the process according to which a visited network is selected (i.e. the method of roaming) is illustrated by the flowchart shown within the square 24. Within square 24, boxes 201, 202, 204, 209, 207, 217 are functional blocks corresponding to tasks performed according to the method whereas the rounded shapes 210, 216 and 214 illustrate some data entries which are required for the functional blocks to perform their functions.

Block 201 corresponds to the signal evaluation (SE) function and is therefore connected to the physical radio interface of the user terminal. It is used to evaluate the radio signal level coming from access nodes of available operator networks in the visited country. It should be noted that operators considered here are operators having a Service Level Agreement (SLA) with the user's home network operator.

By measuring the radio signal strength, which can be done periodically, the SE function is able to communicate information as to the quality of radio conditions to another block that will use this information to trigger a new network operator selection process if needed. In particular, if a selected network operator exhibits a radio signal strength that is too low, namely below a given threshold, then the selection process should be reiterated excluding this network operator.

The transmission of the information pertaining to the radio signal level is illustrated by the arrow 203. This information is retrieved by the block 204 which shall be described later on in the present description.

Block 217 corresponds to the VNF monitoring (VNF-MO) function. Its role is to monitor the different VNF used by the user in its home network operator environment. By doing so, the behaviors of the user in terms of applications and services used and their associated VNF (as described by the process presented in FIG. 1) on his home network can be stored in a database in the user's mobile terminal, which will be used in the selection process as will become further apparent below.

As an example, one possible way to retrieve information related to a past usage of services in the home network by the user is to exploit his profile or information stored locally in the user's terminal or in its SIM card.

The arrow 215 represents the generation of this database by the block 217 and the element 214 represents the database itself containing the information on the network user behavior and the VNF associated to this behavior. This element 214 is intended to be one of three entries of the functional block 209 which shall be described below.

The element 210 represents VNF capabilities which the user in roaming has manually requested using a corresponding interface of his mobile terminal. By so expressing his needs for a specific service or for specifics VNF, the user can directly participate to the building-up of his network profile. This element 210 provides the second entry to the block 209 as it is functionally illustrated by the arrow 211.

The last entry to the block 209 is from the element 216. This entry corresponds to information as to the requirements of the user that, in some embodiments, can be retrieved automatically from external information resources. For instance, by exploiting the user agenda or a to-do tasks list from his mobile device, it is possible to infer the user's needs for one or more specific services in the visited country.

As it is shown by the three arrows 211, 213, 212, the functional block 209 exploits the requirements of the user which are inferred, namely retrieved from external sources, and/or expressed manually by the user interfacing with his mobile terminal, and/or deduced from the user's past behavior in his home network environment, respectively.

Block 209 corresponds to a User's Network Profile builder (UNP-B). By exploiting data from entries 210, 216 and 214, the UNP-B is configured to build-up dynamically a profile based on the VNF used and/or required by the user in roaming. This profile combines the information as to the user behavior learned through his previous usage of his home network and the information as to his current requirements entailed from external sources or given directly by the user through his mobile terminal. The UNP is an entry of the block 204 that represents the Visited Network Operator Selection (VNO-S) function. This VNO-S function is the core component of a device for implementing the proposed method, and will be detailed in what follows.

Block 202 represents the Visited Network Operator Profile Collector (VNO-PC) function. Its function is to collect the capabilities of each network operator in the visiting country having a SLA with the home network operator of the user. Following the principle presented in the above with reference to FIG. 1 it is possible to retrieve a listing of the VNF that can be run by these networks. Context attributes are associated to each VNF of this listing, meaning for instance that a price for a certain amount of data at a certain time schedule can be indicated along with a VNF indicator. Furthermore, this price can depend on the location of the user and therefore be implicitly related to the state of the network. It is to be noted that this information can be used in a transparent way with respect to the user, and can possibly be used within the roaming network selection process.

The arrows 218 illustrate the collection operated by the VNO-PC 202 of the listings of VNF from the visited network operators 23a, 23b and 23c.

The VNO-S function 204 retrieves information from three different entries from which it operates the selection of a network operator in the visited country. These three entries are illustrated in FIG. 2 by the arrows 203, 208 and 205 correspond to the information on the evaluation of the radio signal level, the information on the network profile of the user (and the required VNF associated to it) and the information on the profile of the visited network operators (also containing listings of VNF), respectively.

The selection is achieved by comparing, i.e, matching the dynamic UNP and network operators profile. Based on the matching level achieved by such comparison, an ordered list of preferred/recommended visited network operators is established. This list can be sent to the connection module 207 so that it can establish a connection with the most appropriate visited network. In one example, the selected roaming network is the local network ranking at the top of the ordered list of matching networks. If two networks are eligible (at the top of the list) the selection between these two can be operated according to a further criterion such as, for instance, the cost the needed service(s).

Eventually, the block 207 corresponding the Visited Network Operator Connection (VNO-C) function is configured to collect the information from the selection function as it is illustrated with the arrow 206, and to establish a connection in the visited country with the network operator at the top of the recommended list. In the example represented by FIG. 2, the connection is established, as illustrated by the arrow 219, with the visited network operator 23b. If the connection fails, the VNO-C can proceed to the connection with the next recommended visited network operator in the list.

The invention claimed is:

1. A method executed via a mobile terminal comprising:
obtaining virtual network function capabilities of local networks covering an area visited by a user;
generating a user's network profile based on past usage by the user of services within the user's home network, and based on the user's future needs for services in the visited area;
selecting a local network in said visited area, based on virtual network function capabilities of said local network matching the user's network profile associated with virtual network function capabilities required by said user; and
causing establishment of a connection with the local network selected from an ordered list of candidate local networks having virtual network function capabilities matching said user's network profile, wherein the connection is a roaming connection between at least the mobile terminal and the local network.

2. The method according to claim 1, further comprising:
generating the ordered list of candidate local networks having virtual network function capabilities matching said user's network profile,
wherein selecting the local network comprises selecting the local network from said ordered list of candidate local networks.

3. The method according to claim 1, wherein said local networks include local networks managed by local networks operators having a service level agreement with the user's home network operator.

4. The method according to claim 1, wherein said local networks include local networks exhibiting a radio signal strength in said visited area suitable for establishing a radio connection with the user's mobile terminal in the visited area.

5. The method of claim 1, wherein the user's network profile is dynamically generated and updated in real time.

6. The method of claim 1, wherein the virtual network function capabilities of a local network comprise one or more of the following:
connectivity to 2G, 3G, 5G and/or LTE networks;
an intrusion detection and protection function;
a firewall;
a domain name system;
a policy and charging rule function;
an application optimizer function;
a caching node function;
a video push function; and
a privacy support function.

7. A computer program product comprising one or more stored sequences of instructions that are accessible to a processor and which, when executed by the processor, cause the processor to:
obtain, via a mobile terminal, virtual network function capabilities of local networks covering an area visited by a user;
generate a user's network profile based on past usage by the user of services within the user's home network, and based on the user's future needs for services in the visited area;
select a local network in said visited area, based on virtual network function capabilities of said local network matching the user's network profile associated with virtual network function capabilities required by said user; and
cause establishment of a connection with the local network selected from an ordered list of candidate local networks having virtual network function capabilities matching said user's network profile, wherein the connection is a roaming connection between at least the mobile terminal and the local network.

8. An apparatus comprising
at least one processor; and
at least one memory including computer program code,
the at least one memory and the computer program code configured to, with the at least one processor, cause the apparatus at least to perform:
obtaining, via a mobile terminal, virtual network function capabilities of local networks covering an area visited by a user;
generating a user's network profile based on past usage by the user of one or more services within the user's home network, and based on the user's future needs for the one or more services and one or more additional services in the visited area;
selecting a local network in said visited area, based on virtual network function capabilities of said local network matching the user's network profile associated with virtual network function capabilities required by said user; and
causing establishment of a connection with the local network selected from an ordered list of candidate local networks having virtual network function capabilities matching said user's network profile, wherein the connection is a roaming connection between at least the mobile terminal and the local network.

9. The apparatus according to claim 8, wherein the at least one memory and the computer program code are configured to, with the at least one processor, cause the apparatus to perform:
generating the ordered list of candidate local networks having virtual network function capabilities matching said user's network profile,
wherein selecting the local network comprises selecting the local network from said ordered list of candidate local networks.

10. The apparatus according to claim 8, wherein said local networks include local networks managed by local networks operators having a service level agreement with the user's home network operator.

11. The apparatus according to claim 8, wherein said local networks include local networks exhibiting a radio signal strength in said visited area suitable for establishing a radio connection with the user's mobile terminal in the visited area.

12. The apparatus of claim 8, wherein the user's network profile is dynamically generated and updated in real time.

13. The apparatus of claim 8, wherein the virtual network function capabilities of a local network comprise one or more of the following:
   connectivity to 2G, 3G, 5G and/or LTE networks;
   an intrusion detection and protection function;
   a firewall;
   a domain name system;
   a policy and charging rule function;
   an application optimizer function;
   a caching node function;
   a video push function; and
   a privacy support function.

14. The apparatus of claim 8, wherein the at least one memory and the computer program code are configured to, with the at least one processor, cause the apparatus to perform:
   receiving, from the user via a user interface, a manual request indicating at least a specific service or a specific virtual network function, wherein the specific service or the specific virtual network function are used to generate or update the user's network profile.

15. The apparatus of claim 8, wherein the at least one memory and the computer program code are configured to, with the at least one processor, cause the apparatus to perform:
   retrieving, from the mobile terminal or a Subscriber Identification Module card, behavior data indicating the user's past behavior in his home network environment associated with at least a specific service or a specific virtual network function, wherein the behavior data is used to generate or update the user's network profile.

16. The apparatus of claim 8, wherein the at least one memory and the computer program code are configured to, with the at least one processor, cause the apparatus to perform:
   receiving, from the user via a user interface, an agenda comprising a task and a country; and
   determining, based on the agenda, one or more requirements for the task in the country, wherein the one or more requirements comprises one or more of a specific service, a specific virtual network function, a certain amount of data, a price, a location in the country, or a certain time schedule.

17. The apparatus of claim 12, wherein the user's network profile combines information as to the user behavior deduced from one or more of (1) behavior data associated with the user's home network or a visited network, (2) a requirement associated with at least an external source, (3) a manual request associated with a specific service or a specific virtual network function, or (4) a service level agreement between a plurality of network operators.

18. The apparatus of claim 8, wherein a priority mechanism is implemented to establish a hierarchy between the user's past usage of the home network and the user's future needs, the priority mechanism being used to dynamically combine the user's network profile with one or more local network operator profiles of the ordered list of candidate local networks.

* * * * *

UNITED STATES PATENT AND TRADEMARK OFFICE
CERTIFICATE OF CORRECTION

PATENT NO. : 11,191,014 B2
APPLICATION NO. : 16/465236
DATED : November 30, 2021
INVENTOR(S) : Sayadi et al.

It is certified that error appears in the above-identified patent and that said Letters Patent is hereby corrected as shown below:

On the Title Page

Item (72) Inventors: "Bessern Sayadi" should read --Bessem Sayadi--.

Signed and Sealed this
Eighth Day of November, 2022

Katherine Kelly Vidal
*Director of the United States Patent and Trademark Office*